(12) United States Patent
Bernard

(10) Patent No.: US 6,202,341 B1
(45) Date of Patent: Mar. 20, 2001

(54) REUSABLE PESTICIDE BAIT STATION

(76) Inventor: Alan Bernard, 8885 SW. 7$^{th}$ St., Boca Raton, FL (US) 33433

( * ) Notice: Subject to any disclaimer, the term of this patent is extended or adjusted under 35 U.S.C. 154(b) by 0 days.

(21) Appl. No.: 09/209,707

(22) Filed: Dec. 11, 1998

(51) Int. Cl.$^7$ .................................................. A01M 1/10
(52) U.S. Cl. ............................................. 43/122; 43/131
(58) Field of Search ........................ 43/121, 131, 132.1

(56) References Cited

U.S. PATENT DOCUMENTS

| | | | |
|---|---|---|---|
| D. 377,961 | 2/1997 | Dickson et al. | D22/122 |
| 1,236,245 | * 8/1917 | Abadie . | |
| 1,277,354 | * 9/1918 | Arabian . | |
| 4,648,201 | * 3/1987 | Sherman | 43/131 |
| 4,793,093 | 12/1988 | Gentile | 43/131 |
| 5,048,225 | 9/1991 | Brandli | 43/131 |
| 5,182,879 | * 2/1993 | Hopkins | 43/131 |
| 5,253,450 | * 10/1993 | Muramatsu | 43/122 |
| 5,357,709 | 10/1994 | Lin | 43/131 |
| 5,406,744 | 4/1995 | Schneider et al. | 43/131 |
| 5,446,992 | * 9/1995 | Stewart | 43/131 |
| 5,548,922 | 8/1996 | Welfer | 43/131 |
| 5,555,673 | 9/1996 | Smith | 47/1.5 |
| 5,685,109 | * 11/1997 | Rimback | 43/122 |
| 5,693,331 | 12/1997 | Ballard | 424/405 |
| 5,802,761 | 8/1998 | Demarest et al. | 43/131 |
| 5,927,001 | * 7/1999 | Ballard | 43/131 |
| 5,953,854 | * 9/1999 | Hyatt | 43/131 |

* cited by examiner

*Primary Examiner*—Peter M. Poon
*Assistant Examiner*—Francis T. Palo
(74) *Attorney, Agent, or Firm*—John C. Smith

(57) ABSTRACT

A compact reusable bait station that can be used for either solid or liquid bait. The bait station has an outer wall that defines an inner bait chamber. The chamber, when sealed, prevents liquid bait inside the chamber from flowing out. The chamber has limited access from the outside to reduce evaporation, drying, and contamination of the liquid bait by preventing unnecessary exposure to the environment. Access to the outside is limited to access ports that are sized to allow access by an insect, but nothing larger. The access port is positioned above the level of the liquid bait to prevent leakage. The bait station is fabricated from reusable material, such as plastic, PVC, polyethylene, polypropylene, etc. and may be opened for cleaning and storage. Different configurations, such as triangular, rectangular, or tubular chambers may be used. Alternative embodiments provide ground attachment spikes which may be an integral part of the bait station or a removable attachment.

7 Claims, 13 Drawing Sheets

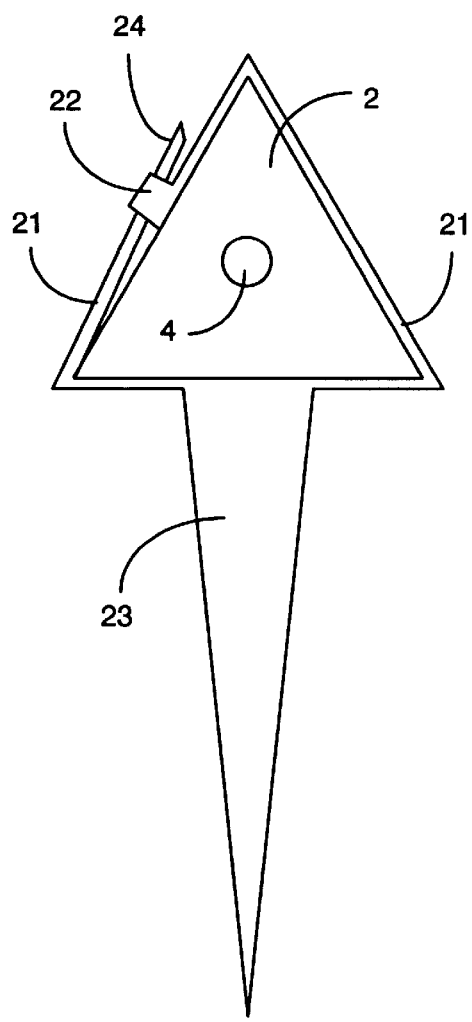
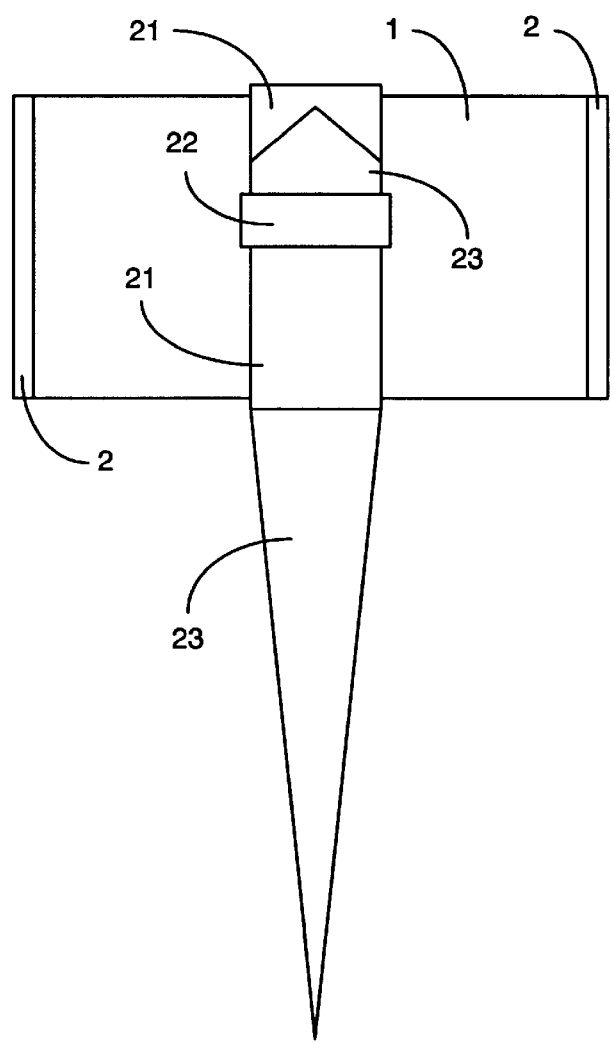
Figure 8A
Figure 8B

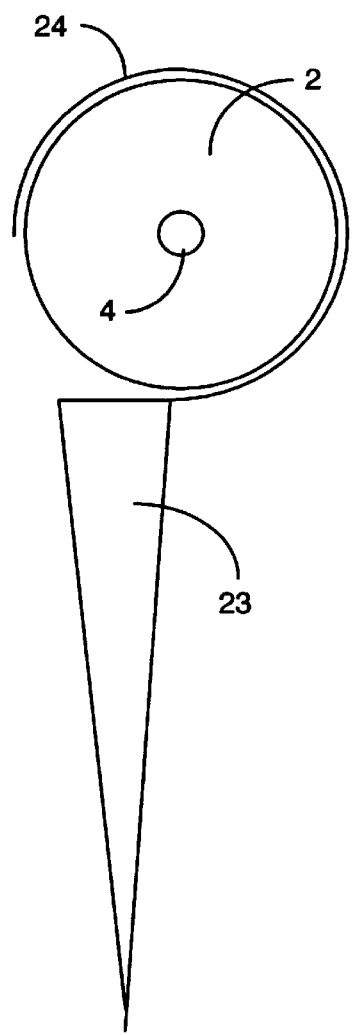
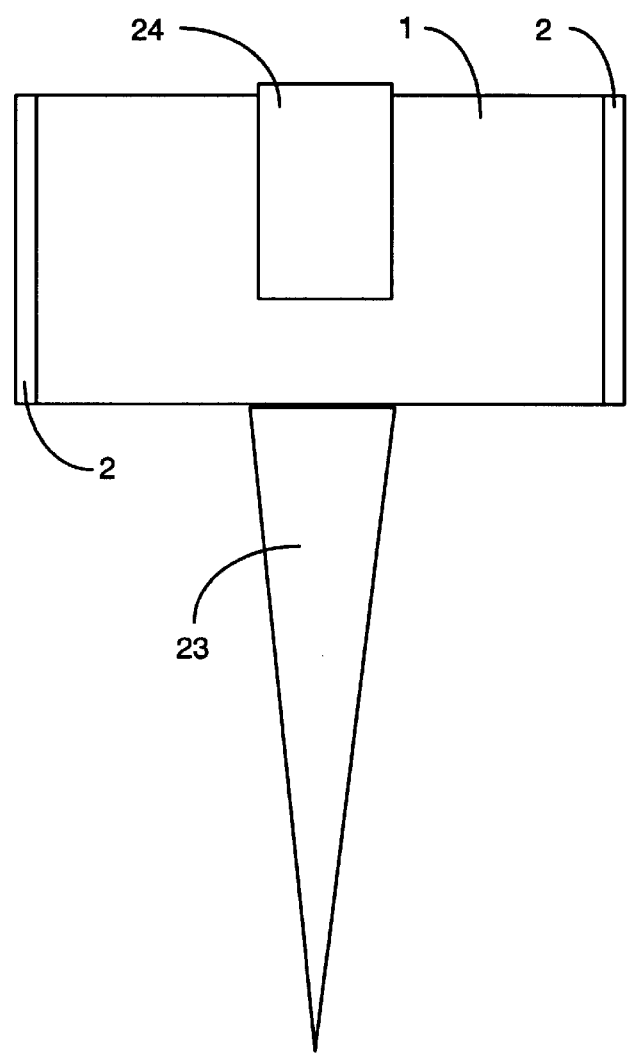
Figure 10A
Figure 10B

REUSABLE PESTICIDE BAIT STATION

BACKGROUND OF THE INVENTION

The present invention relates to pest control devices. In particular, it relates to reusable pesticide dispensers for indoor or outdoor use and which are suitable for solid or liquid pesticides.

The treatment of pest problems has produced a number of devices that are designed to control insect pests. Several approaches have been taken in the design of these devices. These approaches include traps to catch the pest and retain the pest within the trap, and bait stations which are designed to provide a feeding station that contains pesticides which the pest consumes and/or carries back to the colony. With the bait station, the pest exits the feeding station and dies elsewhere.

Trap devices can be based on adhesive traps which contain a scent lure. An insect is attracted by the scent, enters the trap, and becomes stuck on the adhesive and dies. Another form of trap uses light to catch flying insects. With this type of trap, the insect is attracted to the light and flies toward it. In order to reach the light, it must fly through an electrified field which kills it. The common feature of traps is that the insect is killed at the trap. A disadvantage associated with this type of device is that numerous dead insects accumulate which must be disposed of by the user.

Bait stations differ from trap devices in that the insect is not killed at the bait station. Instead, bait which is poisoned with pesticide is provided for consumption by the insect. The insect enters the bait station, devours the bait, exits the bait station, and dies elsewhere. Bait stations of this type can have solid or liquid bait. Bait stations do not result in accumulation of dead insects at the bait station which was a problem created by the traps discussed above. An advantage of bait station over a trap is that when the insect leaves the bait station, it returns to its nest where it can transfer food to other members of the colony who also die from the pesticide they ingest. Several insects may eventually be killed due to the bait brought back to the colony by a single insect. As a result, bait stations may be more effective than trap devices due to their ability to kill insects which have never entered the bait station.

A drawback associated with bait stations is that they are typically self-contained disposable devices. As a result, they tend to be more expensive since the entire device must be replaced whenever the bait is consumed or no longer effective. Due to this, the use of bait is more expensive than it needs to be. It would be desirable to have a self-contained reusable bait station that could be easily refilled when necessary and which reduces dessication of the bait.

Bait stations are typically designed for either indoor or outdoor use. The indoor bait stations are normally designed to be small so that they can be placed in tight areas such as the space under counters, furniture, etc. outdoor bait stations, on the other hand, are as not as constrained by space requirements and therefore have more flexibility in terms of their size and shape. Due to the packaging requirements for indoor bait stations, they typically are not suitable for use outdoors. It would be desirable to have a liquid bait station which is suitable for both indoor and outdoor use and which could be refilled when necessary.

In addition, most bait stations are designed for either solid or liquid bait. While solid bait stations can be prepackaged, a prepackaged liquid bait station would be difficult to handle without spilling the bait. As a result, the user that wants to use both liquid and solid bait would be required to have two types of bait stations. It would be desirable to have a bait station which was suitable for either solid or liquid bait. The bait could then be selected by the user to target a particular species of insect.

Another problem associated with a liquid bait station is that when exposed to the environment, the liquid bait may dry out or evaporate prematurely. This creates unnecessary work and expense for the user, and more importantly, it reduces the effectiveness of the bait station. It would be desirable to have a liquid bait station that protects the liquid bait from the environment such that evaporation or drying out of the liquid bait would be reduced or slowed. In addition, it would also be desirable to have a bait station that protects the bait from contamination or dilution by environmental factors.

While addressing the basic desirability of using bait stations, the prior art has failed to provide a reusable bait station which is inexpensive to manufacture, which has a minimum number of components, which allows easy refilling, which can be used with solid or liquid bait, which reduces or slows evaporation and drying out of the liquid bait, and which can be used indoors or outdoors.

SUMMARY OF THE INVENTION

The present invention solves the foregoing problems by providing a compact reusable bait station that can be used for either solid or liquid bait. The bait station has an outer wall that defines a central chamber that contains bait. The chamber, when closed, is sealed such that when liquid bait is inserted into the chamber, the liquid is prevented from flowing out. The chamber has limited access from the outside to reduce evaporation, drying out, or contamination of the liquid bait by preventing unnecessary exposure to the environment. The access to the outside is limited to access ports that are sized to allow access by an insect, but nothing larger. The access port is positioned above the level of the liquid bait to prevent leakage. The bait station is fabricated from reusable material and may be opened for cleaning. Different configurations, such as triangular, rectangular, or tubular chambers may be used. Alternative embodiments provide ground attachment spikes which may be an integral part of the bait station or a removable attachment.

BRIEF DESCRIPTION OF THE DRAWINGS

FIG. 8A is an end view of an alternative embodiment in which a detachable ground spike is secured to the bait station via a strap.

FIG. 8B is a side view of the embodiment of FIG. 8A which illustrates the attachment of the ground spike to the bait station.

FIG. 10A is an end view of an alternative embodiment in which a detachable ground spike is secured to the bait station via a clamp.

FIG. 10B is a side view of the embodiment of FIG. 10A which illustrates the attachment of the ground spike to the bait station via a clamp.

DESCRIPTION OF THE PREFERRED EMBODIMENT

Figure 1A:
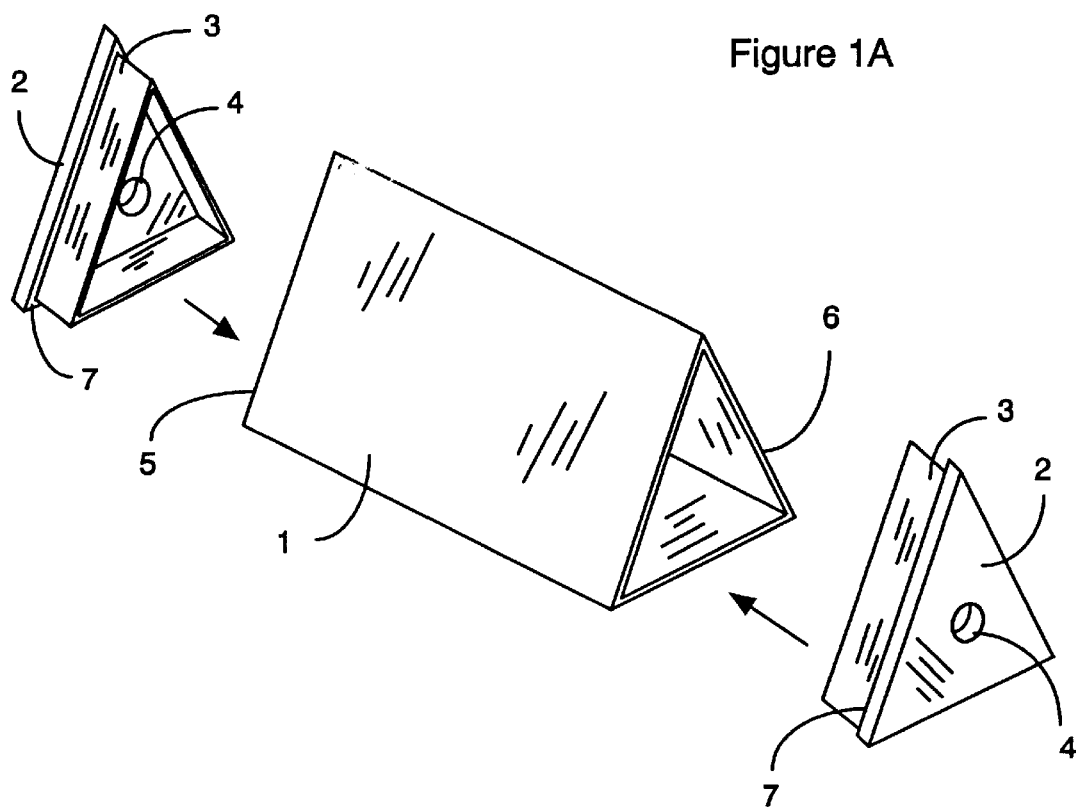
FIG. 1A is a perspective view of a preferred embodiment of the bait station which has a central chamber with removable end caps. Insect access ports are provided in each of the end caps. The central chamber and end caps have a pyramidal structure in this embodiment.

Prior to a discussion of the figures, a general discussion of the features and advantages of the invention will be presented. Principal objectives of the invention are to provide a bait station capable of use with either solid or liquid bait, a bait station which can be used either indoors or outdoors, which protects the bait from moisture and/or contamination, a bait station which reduces air flow through the bait station such that the effective useful life of liquid bait will be increased by reducing the exposure of the liquid bait to the environment, a bait station that reduces evaporation and drying out of the bait, a bait station in which the inner chamber can be easily accessed for the purpose of cleaning or refilling, and a bait station in which the liquid bait is contained such that leakage is avoided and contamination is prevented.

A problem associated with the outdoor use of bait stations is that they can be moved relatively easily by wind, small animals, etc.. As a result, a bait station that is suitable for indoor use may not be suitable for outdoor use because it is not stable enough. A removable ground spike is provided that permits use of an indoor bait station in an outdoor environment. The ground spike is attached to the bait station and inserted into the ground to secure it in place. An integral ground spike is used by an alternative embodiment. However, when the ground spike is an integral part of the device, it is not as suitable for use indoors.

The bait station has an outer wall that forms an inner chamber which contains the bait. The chamber is formed with a limited number of access ports for insects. Only a single access port is needed. However, more than one access port may be used based on considerations such as the size of the bait station, and manufacturing considerations. For example, if the access port is placed in the end cap, then having an access port in both end caps allows the manufacturing to be simplified by having only a single type of end cap, rather than one end cap with an access port and a second end cap with no access port. The advantage of limiting access to the chamber is that the air flow is minimized and, as a result, evaporation or drying out the liquid bait is reduced. This not only saves money for the user by reducing the amount of liquid bait used over a given period of time, but also saves the user's time and makes the bait station more effective by reducing the amount of time that the bait station is inoperable because the bait has dried out.

A principal advantage of the invention over the prior art is that it is structured to allow easy access to the interior chamber for cleaning and refilling. As result, once a particular pest problem is resolved, the bait station can be cleaned and stored for future use. Therefore, the user only needs to purchase the bait station once. In the prior art every time the user needed to set out liquid bait, the bait station would be replaced or a tray within the bait station would be replaced. In addition, since the bait station can be reused, liquid bait can be purchased in bulk quantities resulting in additional savings to the user. Further, since the liquid bait would be stored in sealed containers, when the bait station was needed it can be immediately assembled and filled without requiring the user to waste time and expense traveling to a store to obtain a new bait station. A reusable bait station also allows more than one type of bait to be used. For example, a liquid bait for sweet feeding ants, or a gel bait for ants that prefer proteins or fats.

Further, by limiting access to the chamber, the possibility of leakage is reduced. This is important because bait leakage, which is typically a pesticide, may come in contact with unwanted targets, such as children, pets, or food preparation areas. The access ports are designed such that they are above the level of the liquid bait when it is in the chamber. In addition, the access ports themselves may be used to fill the chamber with liquid bait. The advantage of using the access ports to fill the chamber is that an additional access panel is not needed.

A variety of shapes and sizes of bait stations are illustrated in the figures. There is no requirement for a particular shape of bait station. However, some shapes are more advantageous due to their ease of manufacture in relation to other shapes and configurations. In regard to the access ports, the preferred embodiment uses a ⅛ inch aperture. The ⅛ inch size used in the preferred embodiment is not critical, and in fact may vary based on the size of the particular pest which the user is attempting to eliminate. The placement of the access port in the end caps is done for ease of manufacture since the central portion of the device may be manufactured by techniques such as extrusion, while caps would more likely be made via molding. In is important, however, that the access ports be located above the floor of the device to prevent any of the liquid bait from leaking out of the access port.

One exception to the previous discussion about the shape of the bait station relates to the positioning of the bait station in special locations. For example, if the bait station is to be placed against a wall, then a right triangle shape is preferred.

The device presented herein, provides a reusable bait station that can be easily opened for cleaning and storage, can be conveniently refilled, and can be used for either solid or liquid bait. While the foregoing discussion has focused on the use of liquid bait, those skilled in the art will recognize that the device can just as easily be used for solid bait or gel. The bait station structure taught herein provides similar benefits for users of solid bait. For example, by sealing the solid bait inside the chamber, unwanted contacts with children or pets are less likely to happen. Further, by storing the solid bait inside the chamber, it can be left outside and be protected from environmental factors such as rain. The savings advantages also apply to the use of the bait station with solid bait. Of course, the bait station itself needs only to be purchased once. In addition, larger supplies of solid bait can be purchased in bulk and stored in sealed packages for use when needed. Having discussed the features and advantages of the invention in general terms, we turn now to a more detailed discussion of the figures.

Referring to FIG. 1, this figure shows a perspective view of a preferred embodiment of the invention in which the central chamber 1 is sealed at both ends 5, 6 by end caps 2. In this embodiment, the central chamber 1 has a pyramidal structure. As noted above, the shape of the chamber is not important. For ease of manufacturing, non-varying shape such as that used by the central chamber 1 allows a variety of manufacturing techniques to be used. For example, the central chamber 1 can be manufactured by an extrusion process, or via molds. The end caps 2 each have an extension 3 which is designed to slidably and snugly fit into the inside channel of central chamber 1. In the preferred embodiment, the end caps 2 and their extensions 3 are made from flexible material which will allow the extensions 3 to be pressed against the inside wall of central chamber 1. This allows the ends of central chamber 1 to be sealed such that liquid bait will not leak out once the end caps 2 are inserted. The end caps 2 are inserted such that the surfaces 7 of end caps 2 rest against the end surfaces 5, 6 of central chamber 1. Alteratively, the end caps 2 can also be structured such that the extensions 3 fit snugly over the outside of the central chamber 1 rather than inside. The placement of the extensions 3 on the inside or outside of the central chamber 1 is not important so long as leakage is prevented.

Access ports 4 are provided in each of the end caps 2. Only one access port 4 is required for each bait station. However, by placing an access port 4 in each end cap 2, the manufacturing process is simplified since only one type of end cap 2 is required. If only one access port 4 was used on the bait station, then two types of end caps 2 would have to be manufactured, one with and one without an access port 4.

The bait station can be fabricated by any suitable material. For example, central chamber 1 may be fabricated from metal, wood, plastic, polyethylene, polypropylene, etc. The only requirement is that the material selected will perform suitably and will not react chemically with the bait Likewise, the end caps 2 can be fabricated from any suitable material. However, the end caps 2 should also be fabricated from materials that are flexible to allow the extensions 3 to be press fitted against the interior walls of central chamber 1 to ensure that the bait station does not leak. Those skilled in the art will recognize that the bait station can alternatively be fabricated such that the end caps 2 are rigid and the central chamber 1 is flexible for the purpose of providing a snug fit and preventing leakage.

As mentioned above, the size of the bait station may vary based on the type of pest. Clearly, a smaller insect such as an ant would not require as large an access port 4 as would a larger insect such as a roach or a beetle. In the preferred embodiment, a ⅛ inch access port 4 is used. Those skilled in the art will recognize that the smaller the access port 4, the more effective the protection of the bait 8 is.

Figure 1B:
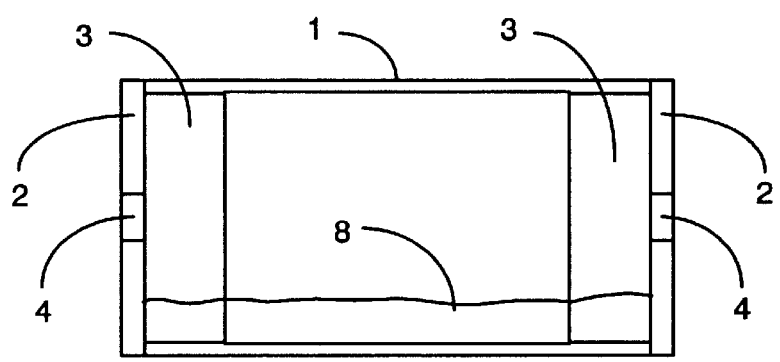
FIG. 1B is a side cut away view of the device of FIG. 1A. The end caps are shown installed on the central chamber. This figure also illustrates the pesticide which is shown resting on the bottom of the chamber.

FIG. 1B is a side cut away view of the embodiment of FIG. 1A. In this view, the end caps 2 are shown inserted into the central chamber 1. The extensions 3 are snugly pressed against the interior wall of the central chamber 1. Also illustrated in this figure is bait 8 which can be liquid or solid. If the bait is solid, it can be either a single solid piece, small pieces, moist pieces, or even dry flowable granular bait. The access ports 4 are located such that they are above the fill level of the bait station. This prevents the bait 8 from leaking out of the access ports 4.

Those skilled in the art will recognize that the central chamber 1 could also be shaped in cup-like fashion such that only a single end cap 2 would be required.

Figure 2:
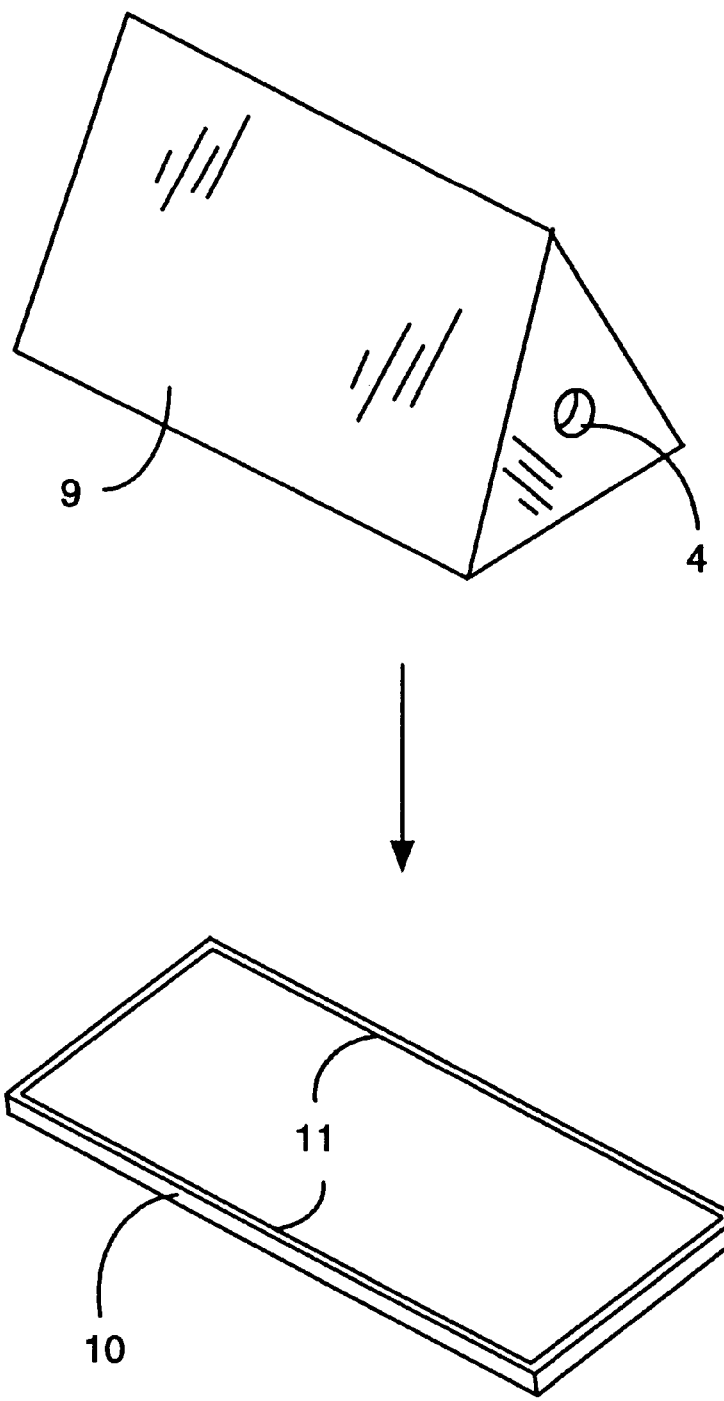
FIG. 2 is an alternative embodiment in which the chamber is formed by an upper cap which is secured to a bottom plate.

In FIG. 2, an alternative preferred embodiment is shown. In this embodiment, only two pieces are required: a floor panel 10 and an upper housing 9. The upper housing 9 is attached to the floor panel 10 at attachment lip 11. Attachment lip 11 is a sealable edge connection that secures upper housing 9 to floor panel 10. Sealable edges are well-known in the art for all manner of containers. This embodiment provides the advantage of only having two parts: an upper housing 9 and a lower floor panel 10. As shown in the figure, the end caps are integrated into the upper housing 9. As was the case with the previous embodiments, any suitable material can be used to fabricate this embodiment. In addition, since the upper housing 9 and both end caps are fabricated as a single piece, there is no advantage to forming more than one access port. Therefore, protection from the environment can be increased and the rate of evaporation and drying of the bait 8 can be further slowed by using only a single access port 4.

Figure 3:
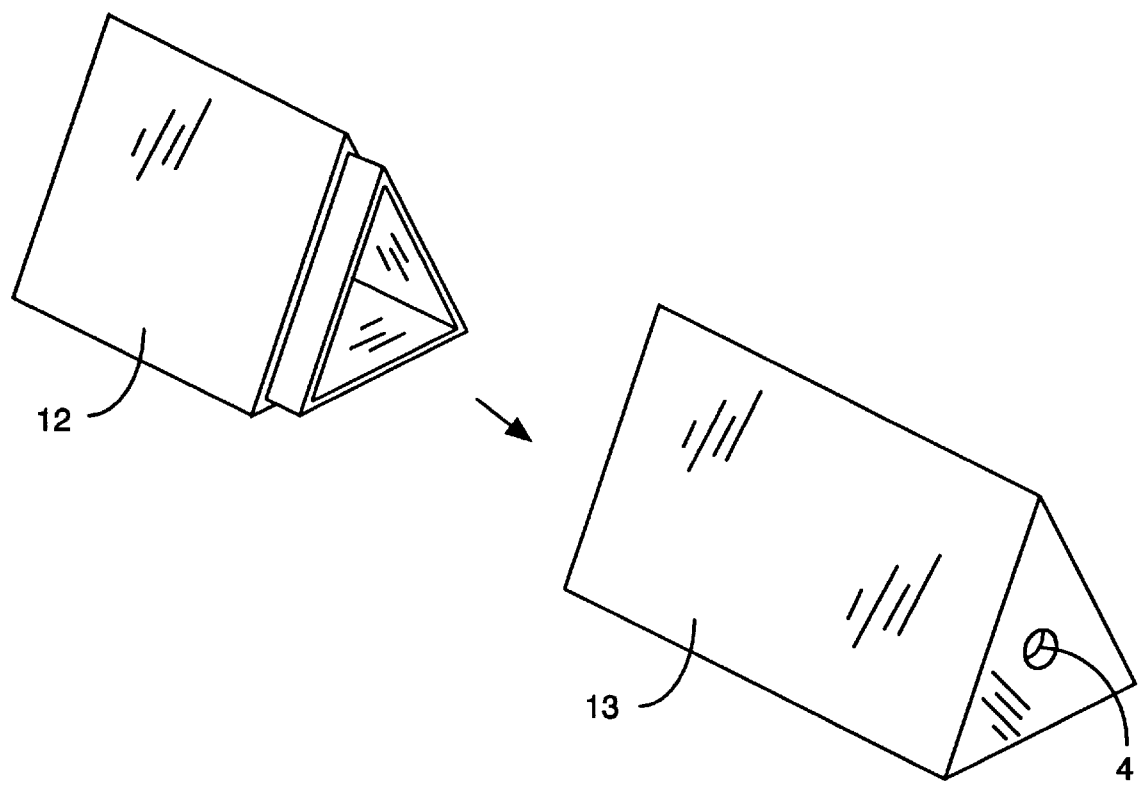
FIG. 3 is another alternative embodiment in which the chamber is formed by two opposing end pieces which are mated together.

FIG. 3 shows a perspective view of another preferred embodiment in which the bait station is formed by two mated end sections. In this embodiment, a male section 12 is inserted into a female section 13 to form the bait station. Since two separate molds would be required to fabricate this particular embodiment, there is no advantage to having multiple access ports 4.

Figure 4:
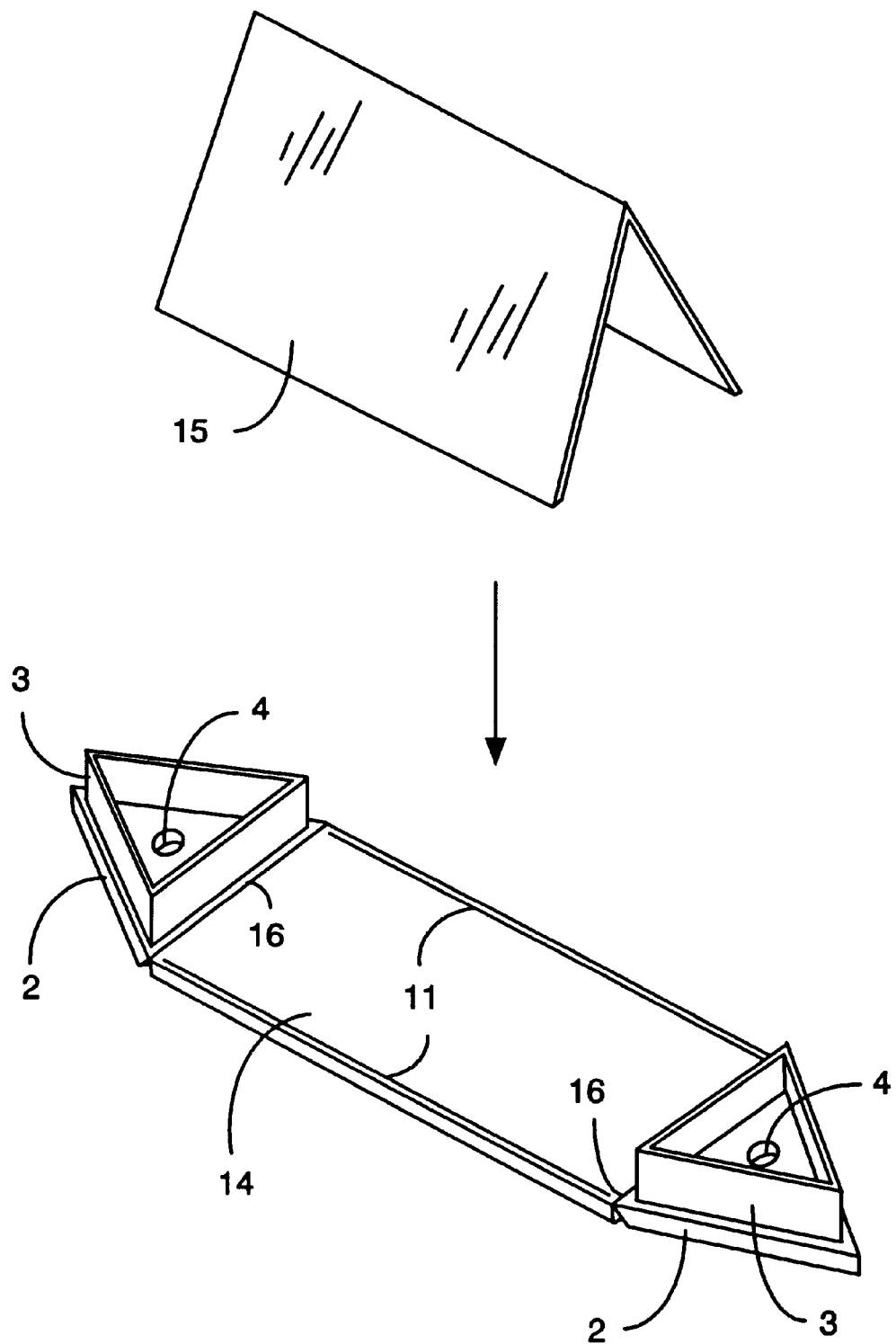
FIG. 4 is another alternative embodiment in which the chamber is formed by a floor plate that has the end caps attached via living hinges and the upper walls of the central chamber formed by wall sections that attach to the floor plate and the end caps.

FIG. 4 shows a perspective view of another preferred embodiment. In this embodiment, a floor panel 14 is fabricated with the end caps 2 attached via living hinges 16. This allows floor panel 14 and the attached end caps 2 to be molded as a single piece. A separate upper wall segment 15 is attached to the floor panel 14 at attachment lips 11. The end caps 2 are then folded up and secured to upper wall segment 15. This figure illustrates access ports 4 in both end caps 2. However, since the floor panel 14 and the end caps 2 are formed by a single mold, the user has the option of determining whether one or more access ports 4 are desired without complicating the manufacturing process.

Figure 5:
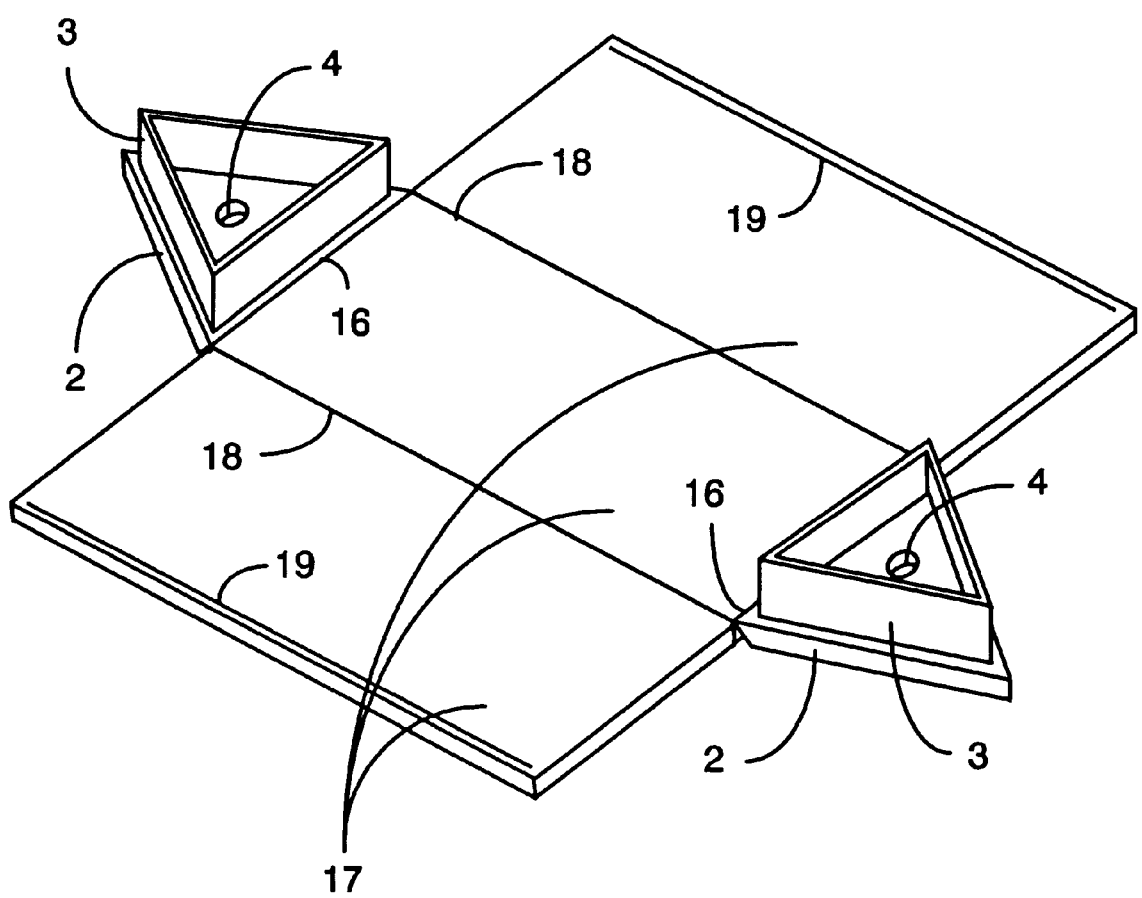
FIG. 5 is yet another alternative embodiment in which the chamber is formed by a single piece. In this figure, the floor plate is attached to the end caps via living hinges, and in addition, the upper walls are attached to the floor plate via living hinges and meet and seal at the top.

FIG. 5 shows yet another preferred embodiment. This figure is a perspective view of a single piece bait station. The advantage of this embodiment is that the bait station can be fabricated in a single piece mold with results in reduced manufacturing costs for both the molding and assembly processes. In this embodiment, three separate wall panels 17 are attached to one another via living hinges 18. In addition, the end caps 2 are attached to the central wall panel 17 via living hinges 16. When the device is assembled, the end caps 2 are folded upward by bending along living hinges 16. Then the exterior side walls 17 are folded upward by bending along living hinges 18 until they rest against extensions 3. At this point the edges of the exterior side walls 17 are sealed together by attachment lips 19. Attachment lips 19 may be formed by any number suitable methods including male/female engagement, clips, Velcro, etc. As noted above in regard to the previous embodiments, only one access port 4 is required, but others may be added.

Figure 6:
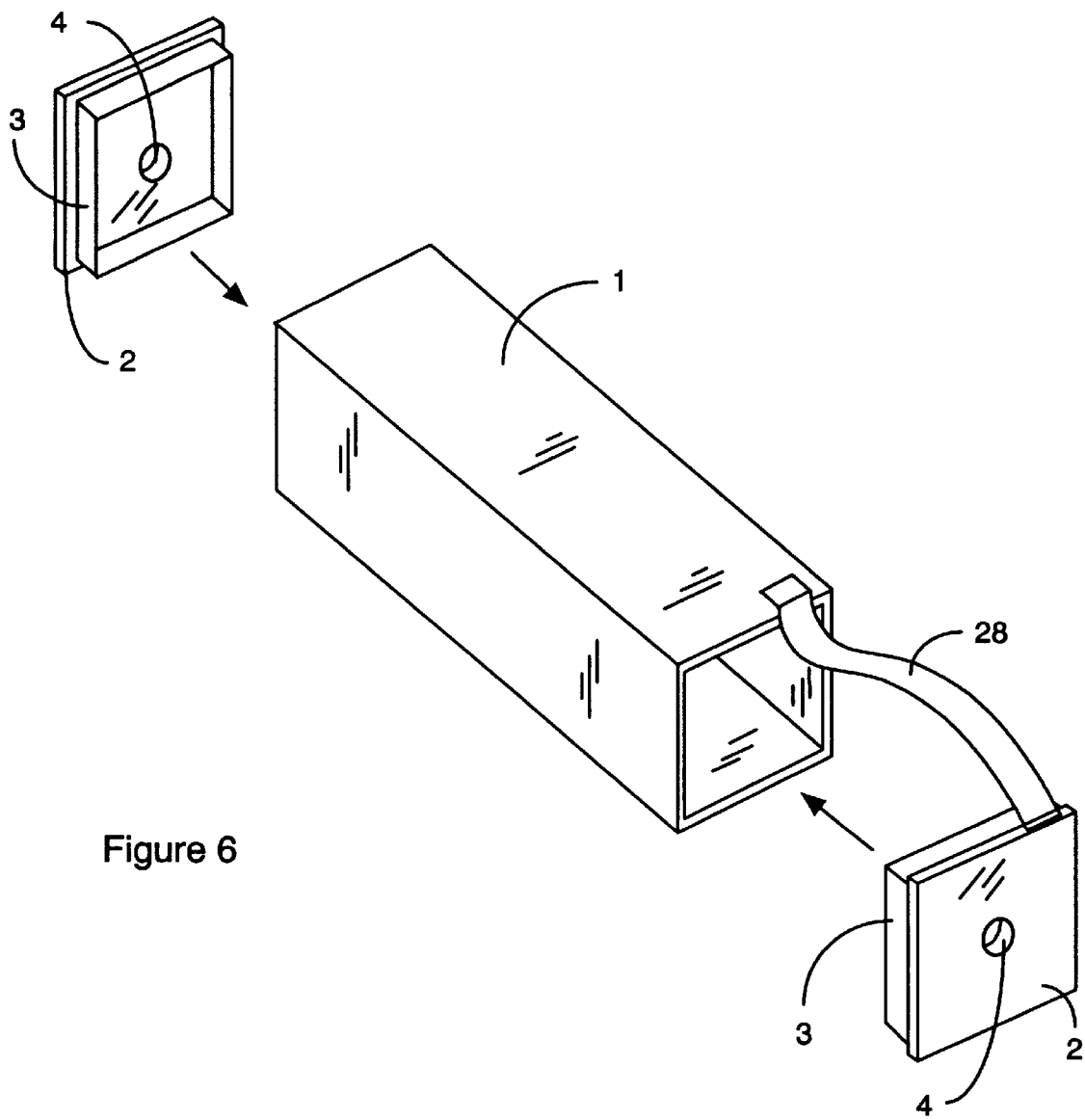
FIGS. 6 is a further alternative embodiment in which the central chamber is substantially rectangular. Two end caps seal both ends of the central chamber and contain access ports for the insects.

FIGS. 6 shows a perspective view of another alternative preferred embodiment. In this embodiment, the pyramidal structure used in the foregoing embodiments is replaced with a rectangular structure. The central chamber 1 in this structure can be manufactured in the same manner as the foregoing structures. For example, it can be made by an extrusion process, via molding, etc.. The end caps 2 are also reshaped to fit the rectangular configuration of the central chamber 1. Those skilled in the art will recognize that the same techniques used to produce the embodiments of FIGS. 1–5 can be used to produce the same variety of embodiments of the structure shown in FIG. 6. For example, living hinges can be used to produce and single piece rectangular structure in the same manner as a single piece with living hinges was used to produce the pyramidal structure of FIG. 5.

Also illustrated in FIG. 6 is an optional attachment strap 28. The attachment strap 28 is a flexible strap that prevents the end caps 2 from being accidentally misplaced. In addition, since it secures the end cap 2 to the larger bait station, it prevents ingestion by small children, pets, etc. Of course, the attachment strap 28 can optionally be used with any of the embodiments disclosed herein.

Figure 7:
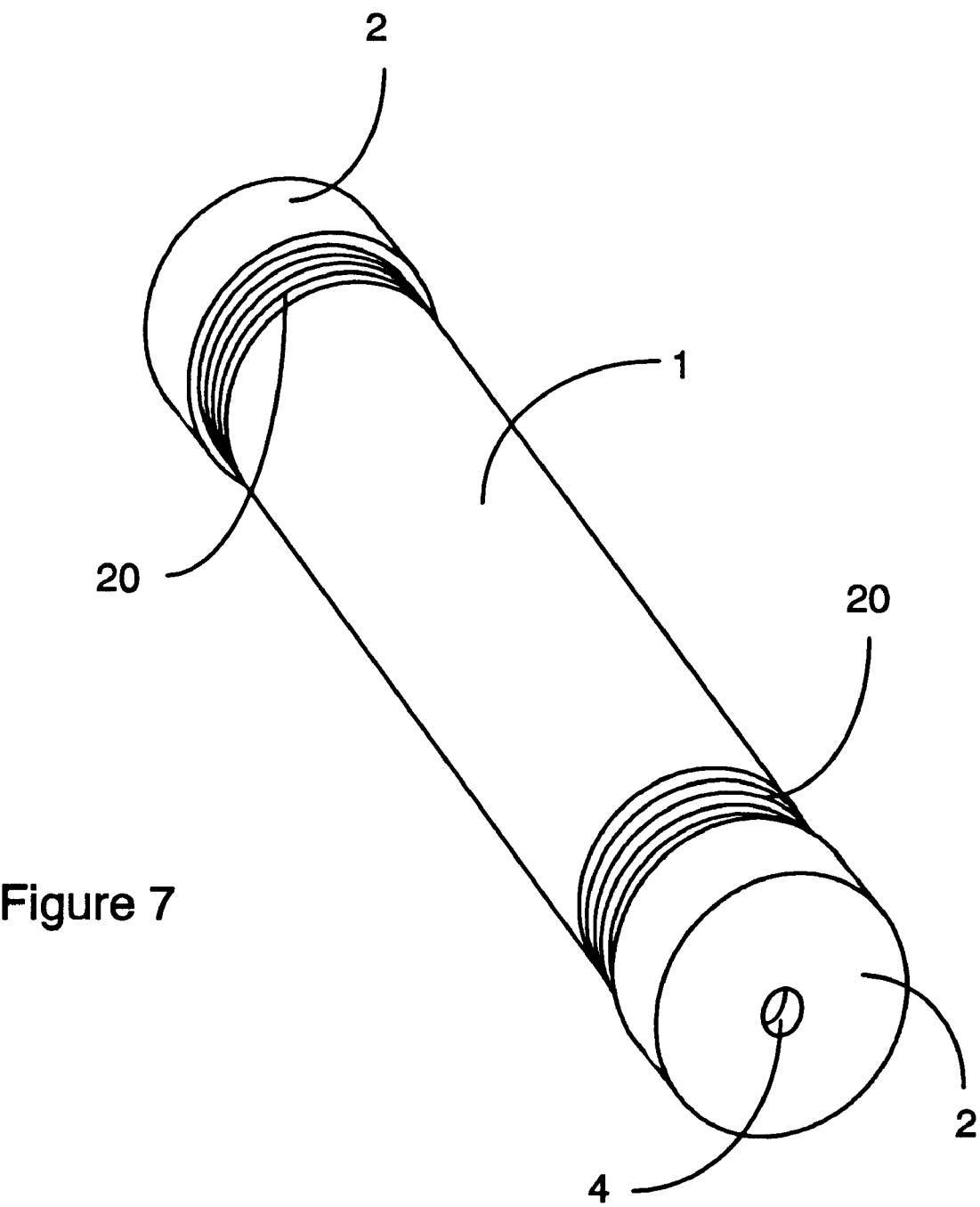
FIG. 7 is another alternative embodiment in which the central chamber has a tubular structure. End caps are provided which are secured to the central chamber via threading.

FIG. 7 is a perspective view of a preferred embodiment which uses a tubular structure. In this figure, the central chamber 1 is secured to the end caps 2 via threads 20. This eliminates the need for the extensions 3 used in the previous embodiments. An additional advantage of this embodiment is that the bait station can be fabricated from off-the-shelf components such as PVC pipe, metal pipe, etc. Of course, they can also be fabricated by molding, extrusion processes, etc.

Those skilled in the art will recognize that if the extensions 3 are used, then the threading 20 can be eliminated. Also, if the threading 20 is eliminated, the extensions can be pressure fit against the outside of central chamber 1 as well as against the inside.

FIG. 8A shows another alternative embodiment in which a ground spike 23 is used to secure the bait station to the ground when it is used in an outdoor environment. For illustrative purposes, the pyramidal bait station structure of FIGS. 1–5 is used. However, any bait station structure can he secured to the ground spike 23 in this manner. The ground spike 23 has a strap 21 that wraps around the cover wall of the bait station and secured by threading the tip 24 of strap 21 through a locking mechanism 22. In the preferred embodiment, the strap is fabricated from flexible material such as nylon. The locking mechanism 22 used to secure the strap 21 is well known in the art. By using the ground spike 23, the same bait station that is used indoors can be used in an outdoor environment.

FIG. 8B shows a side view of the embodiment of FIG. 8A. In this view, the location of the ground spike 23 and the position of the locking mechanism 22 can be more clearly seen.

Those skilled in the art will recognize that in addition to the strap mechanism used in the embodiment of FIGS. 8A–B, a variety of other mechanical means are available to attach the ground spike 23 to the bait station. For example, the ground spike 23 could be threaded onto the bottom of the bait station, clamps could be used, adhesive could be used, etc.

Figure 9A:
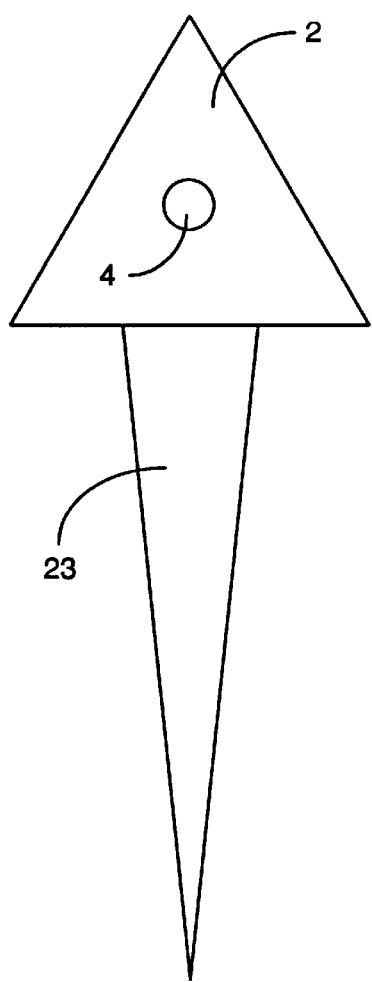
FIG. 9A is an end view of an alternative embodiment in which the bait station has an integral ground spike attached to it.

FIG. 9A shows another alternative embodiment in which the ground spike 23 is an integral and permanent part of the bait station. The ground spike 23 can be molded as part of the bait station or it can be permanently attached later via adhesives or mechanical means such as clamps. While the ground spike 23 makes the bait station less desirable for use indoors, it can still be used. For indoor use, bait station need only be laid on a central chamber 1 wall that does not have the ground spike 23 protruding from it.

Figure 9B:
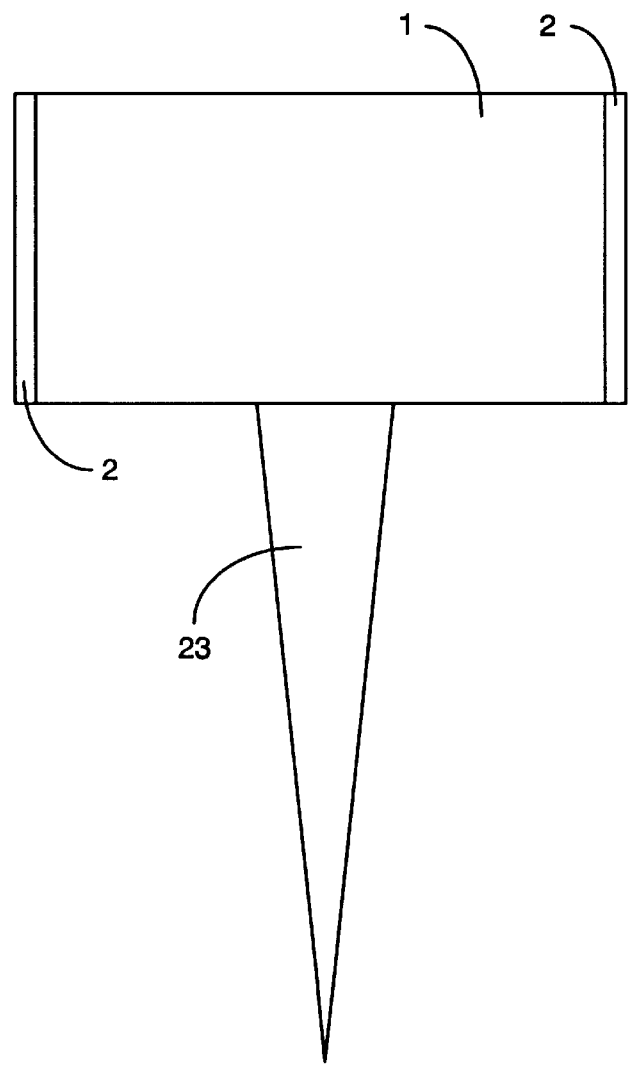
FIG. 9B is a side view of the embodiment of FIG. 8A which illustrates the integral ground spike attached to the bait station.

FIG. 9B shows a side view of the embodiment of FIG. 9A. This view also shows positioning of the ground spike. Those skilled in the art will recognize that the ground spike 23 on any of the embodiments does not have to be located centrally and can in fact be positioned in any convenient location. Further, more than one ground spike 23 can be used with a bait station.

In FIGS. 10A–B, an alternative preferred embodiment is shown which uses a flexible snap-on clamp 24 to secure the bait station to the ground for outdoor use. In FIG. 10A, an end view of the bait station is shown which illustrates a clamp 26 wrapped around a tubular bait station. The clamp 24 attaches to the bait station by flexing the clamp 24 to fit over the bait station. The clamp 24 is attached at one end to a ground spike 23 which is pushed into the ground to secure the bait station in place.

FIG. 10B is a side view of the embodiment of FIG. 10A which illustrates the attachment of the clamp 24 and the ground spike 23 to the bait station. Also, this figure shows the use of end caps 2 which use extensions 3 that are inserted into the central chamber 1. This illustrates an alternative structure to that used in FIG. 7 in which threading was used to secure the end caps 2.

Those skilled in the art will recognize that clamp 24 can be shaped to fit a bait station having any shape.

Figure 11A:
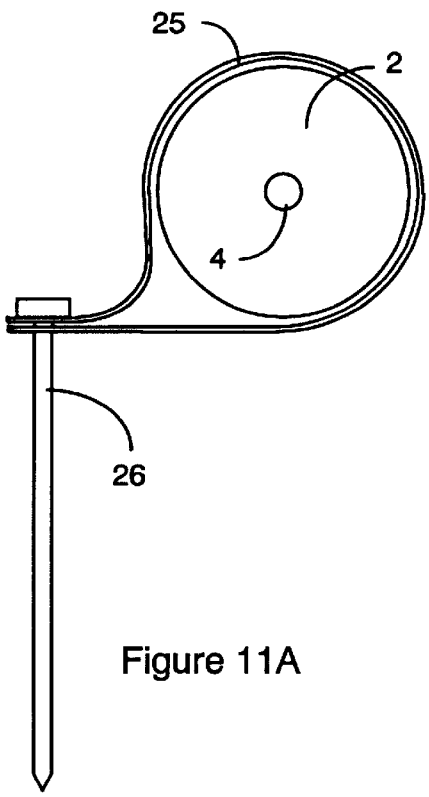
FIG. 11A is an end view of an alternative embodiment in which a detachable strap is wrapped around the bait station and secured to the ground via a nail.

FIG. 11A is an end view of an alternative embodiment in which a detachable strap 25 is wrapped around the bait station and secured to the ground via a common nail 26. This method reduces manufacturing costs since the strap 25 and the nail 26 are commercially available devices which require no special tooling.

Figure 11B:
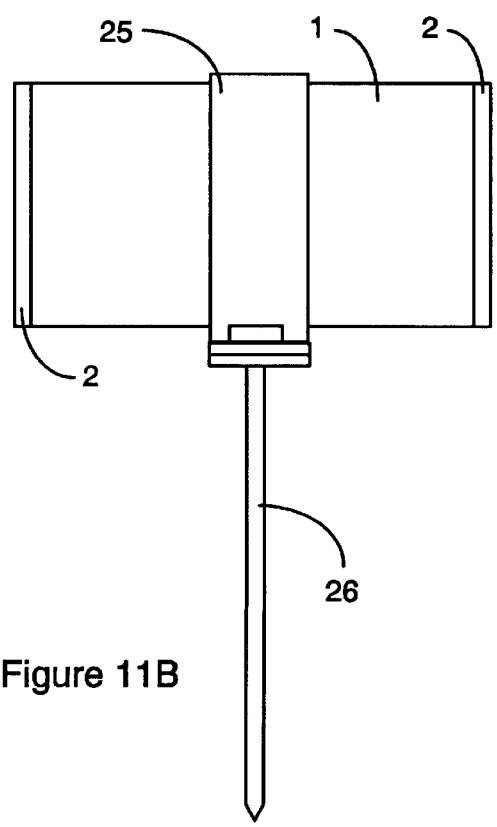
FIG. 11B is a side view of the embodiment of FIG. 11A which illustrates the attachment of the detachable strap and nail to the bait station.

FIG. 11B is a side view of the embodiment of FIG. 11A which illustrates the attachment of the detachable strap 25 and nail 26 to the bait station. This embodiment also illustrates the use of non-threaded end caps 2 that are secured via extensions 3.

Figure 11C:
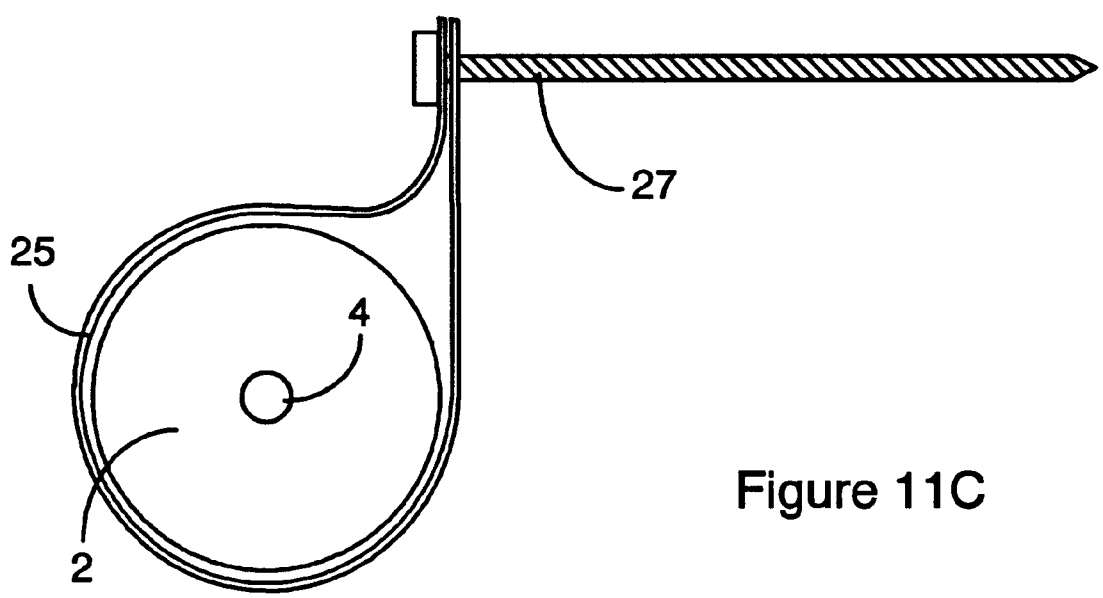
FIG. 11C is a side view of an alternative embodiment of FIG. 11A in which nail is replaced with a screw to allow mounting the bait station to a wall or other structure.

FIG. 11C is a side view of an alternative embodiment which replaces the nail 26 with a screw 27. The screw 27 allows the bait station to be mounted in a variety of indoor locations such as walls or other structures.

Figure 12A:
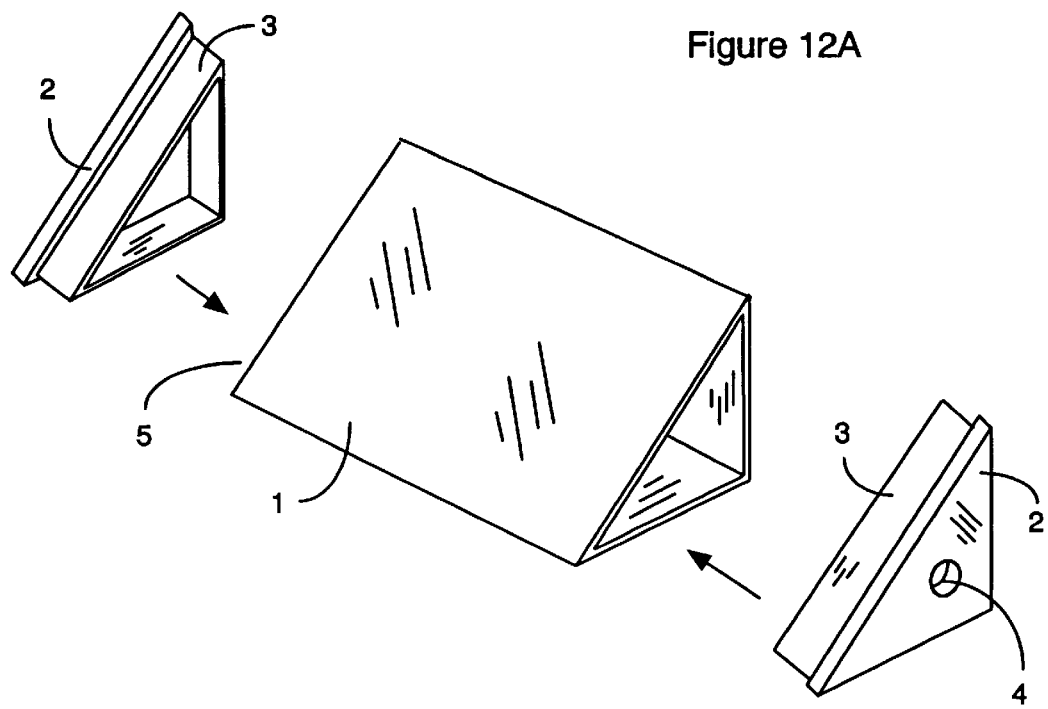
FIG. 12A is a perspective view of a preferred embodiment of the bait station which has a central chamber with removable end caps. Insect access ports are provided in each of the end caps. The central chamber and end caps have a right angled triangle structure in this embodiment to allow the bait station to be placed on a floor against a wall.

FIG. 12A is a perspective view of a preferred embodiment of the bait station which has a central chamber 1 with removable end caps 2. Insect access ports 4 are provided in each of the end caps 2. The central chamber 1 and end caps 2 have a right angled triangle structure in this embodiment to allow the bait station to be placed on a floor against a wall. This structure is particularly useful in situations where the user wants to place the bait station against a wall. In the case where insects crawl around the perimeter of a room at the wall's edge, the placement of the bait station in this manner will encourage the insects to crawl through the bait station. Once entering the bait station, the insects will take some of the bait 8, exit the bait station and return to the nest.

Figure 12B:
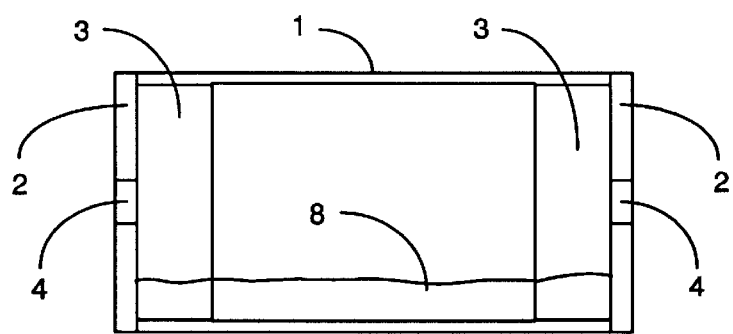
FIG. 12B is a side cut away view of the device of FIG. 12A. The end caps are shown installed on the central chamber. This figure also illustrates the pesticide which is shown resting on the bottom of the chamber.

FIG. 12B is a side cut away view of the bait station of FIG. 12A. The end caps 2 are shown installed on the central chamber 1. This figure also illustrates the bait 8 which is shown resting on the bottom of the central chamber 1.

As discussed earlier, the bait station taught herein provides an environmentally protected chamber for bait in a bait station which reduces the rate of drying and evaporation. In addition, it also protects the bait 8 from contamination from a variety of causes. For example, if left exposed, the bait 8 can be contaminated by dirt, water, liquids, etc. Another benefit of the enclosed structure provided by the bait station is that the bait 8 may be contaminated by odors from a variety of sources, including household cleaners and cigarette smoke. By enclosing the bait 8 in the bait station, undesirable odors that would otherwise contaminate the bait 8 would not be able to easily get to the bait 8 inside the protected environment of the bait station. Further, by positioning the access ports 4 properly, the embodiments disclosed herein provide sealed chambers capable of holding liquid bait 8 without allowing the liquid bait 8 to leak out of the bait station. Further, the bait station disclosed herein provides the user with the ability to use the bait station either indoors or outdoors. Likewise, there is no limitation on the shape or size of the bait station.

While the invention has been described with respect to preferred embodiments thereof, it will be understood by those skilled in the art that various changes in detail may be made therein without departing from the spirit, scope, and teaching of the invention. For example, the material used to construct the station may be anything suitable for the type of insect and/or the type of bait used, the size and shape of the bait station can vary. The type of ground spike, if any, can vary in orientation, size, or number, etc. Accordingly, the invention herein disclosed is to be limited only as specified in the following claims.

I claim:

1. A reusable bait station for dispensing solid or liquid baits, further comprising:

a central chamber, at least one access port limited in size such that it is just sufficient to allow entry and exit of preselected types of insects, the access port located above the bottom of the central chamber;

means to access the interior of the bait station for cleaning and for refilling with the previous or a new type of bait, means to substantially seal the central chamber such that liquid bait placed in the chamber will be contained in the bottom of the central chamber without leakage, the means to seal the central chamber further comprise:

at least one removable end cap removably attached to the central chamber such that, when attached, it forms a leakproof seal on the bottom of the central chamber; and the access port is located in the end cap above the bottom of the central chamber;

whereby the bait station can be used to dispense multiple types of bait, and the limited size of the access port protects the bait from contamination or dilution by environmental factors.

2. A bait station, as in claim 1, further comprising:

an attachment strap attached at a first end to the central chamber and at a second end to the end cap, the attachment strap having sufficient length to allow the end cap to be detached from the central chamber;

whereby the attachment strap secures the end cap to the central chamber.

3. A bait station, as in claim 1, wherein the central chamber is a pyramidal structure having a floor panel, at least a first angled wall, at least a second angled wall which joins the first angled wall, and at least one end cap.

4. A bait station, as in claim 1, wherein the central chamber is a rectangular structure having a floor panel, at least a first side wall attached to the floor panel, at least an upper wall attached to the first side wall, at least a second side wall attached to the upper wall and the floor panel, at least one end cap.

5. A bait station, as in claim 1, wherein the central chamber is a tubular structure having an end cap at each end.

6. A bait station, as in claim 5, wherein the end caps are attached by threading.

7. A bait station, as in claim 5, wherein the end caps are attached by pressure fit extensions.

* * * * *